No. 642,191. Patented Jan. 30, 1900.
J. S. WRIGHT.
BICYCLE SADDLE.
(Application filed Jan. 3, 1898.)
(No Model.)
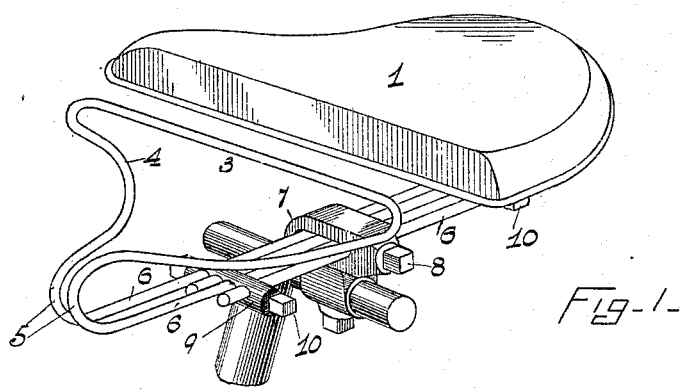
Fig-1-
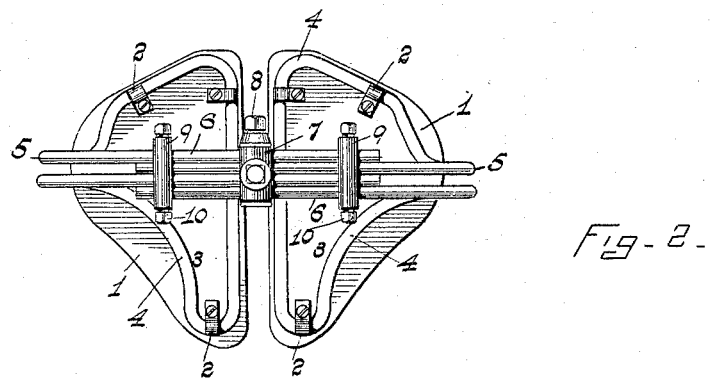
Fig-2-
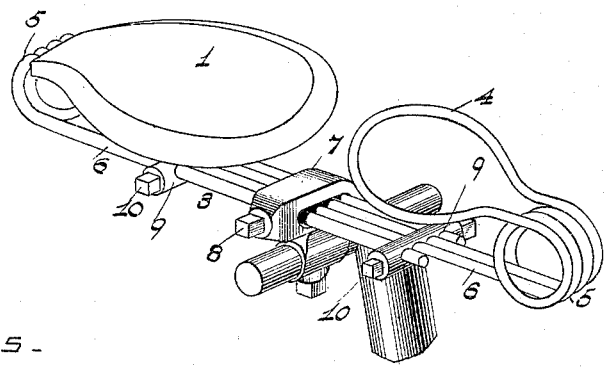
Fig-3-
WITNESSES-
Wm. H. Varnum
William Claus
INVENTOR
John S. Wright.
by his atty.
Charles S. Gooding.
THE NORRIS PETERS CO., PHOTO-LITHO., WASHINGTON, D. C.

UNITED STATES PATENT OFFICE.

JOHN S. WRIGHT, OF DUXBURY, MASSACHUSETTS.

BICYCLE-SADDLE.

SPECIFICATION forming part of Letters Patent No. 642,191, dated January 30, 1900.

Application filed January 3, 1898. Serial No. 665,496. (No model.)

*To all whom it may concern:*

Be it known that I, JOHN S. WRIGHT, a citizen of the United States, residing at Duxbury, in the county of Plymouth and State of Massachusetts, have invented a new and useful Bicycle-Saddle, of which the following is a specification.

This invention has for its object to provide a saddle for bicycles which shall be comfortable, easy riding, and so constructed that the weight of the rider shall be supported upon the bones of the pelvis and that no pressure shall be brought to bear upon the middle flesh.

The invention consists in making the bicycle-seat in two parts supported upon springs adjustable toward and away from each other.

The invention also consists in supporting the seat upon springs in such a manner that the seat will be resilient vertically from the weight of the rider and also that each part of the seat will be independently resilient to accommodate the motion of the rider's legs when propelling the bicycle.

The invention still further consists in devices whereby the resiliency of the seat-supporting springs is rendered greater or less, as may be desired.

Referring to the drawings forming a part of this specification, Figure 1 is a perspective view of my improved bicycle-saddle, one of the pads forming the seat portion being removed. Fig. 2 is an underneath plan of the same. Fig. 3 is a perspective view of a modified form of my invention.

Similar numerals refer to similar parts throughout the several views.

In the drawings the pads 1 1, forming the seat portion of the saddle, are fastened by clamps or clips 2 2 to the seat-supporting springs 3 3. Said springs are each formed of a single piece of wire bent to form a suitable support for the pads 1 1, substantially in a horizontal plane, forming a rim 4, to which pads are fastened. The wire is bent downwardly at the outer side of the pad, as at 5, and both arms 6 6 are brought from the side at 5 toward and past the center of the seat in a plane substantially parallel to the seat-supporting portion or rim 4. The arms 6 6 pass through the bicycle-seat clamp 7 and are fastened thereto by a set-screw 8. Upon each side of the clamp 7 is an auxiliary clamp 9, through which the arms 6 6 from each side of the saddle pass and to which they are fastened by the set-screw 10. In order to adjust the pads 1 1 toward or away from each other, the set-screws 8 and 10 10 are loosened, the pads placed at the desired distance apart by sliding the arms 6 6 in the clamp 7 to the desired distance, and then tightening the set-screws. The springs 3 3 give the necessary vertical resiliency by bending at the curved portion 5 thereof and also in a less degree along the horizontal arms 6 6 up to the clamp 9, where they are reinforced in each case by the strength of the arms 6 6 from the opposite side of the clamp 7. It will thus be seen that the spring-arms 6 6 will be less rigid the nearer the clamp 9 is approached to the clamp 7, and vice versa It will be understood that each side of the saddle is resilient independent of the other both in relation to the vertical motion due to the rider's weight and to the pressure brought to bear by the rider's legs when propelling the bicycle. In the latter case the front portion 1 1 of the seat upon each side is alternately pushed down and the springs 3, subjected to a torsional strain, yield sufficiently to accommodate the motions of the rider's body without danger of chafing or bruising the parts directly in contact with the seat portion of the saddle.

It will be seen that the two sides of the saddle being independently supported upon springs renders the saddle of my invention automatically adjustable to the varying pressures to which it may be subjected, or, in other words, it will fit itself to the varying shape or habits of the rider. For instance, some riders are larger and heavier on one side than the other and others push harder upon one side than the other, but in my saddle these variations of physique or action are accommodated and no injurious effects to the rider result therefrom.

In Fig. 3 I have illustrated a modified form of spring, wherein the portion 5 of the spring 3 is given one turn and a half in order to give more resiliency to the seat.

Having thus described my invention, what I claim, and desire to secure by Letters Patent, is—

1. A bicycle-saddle, consisting of two pads or seats, each pad supported by a single wire spring, comprising a rim to which the pad is fastened, the free ends of the wire being bent downwardly at the outer side of the seat or rim, midway between the front and rear of said seat or rim, thence extending inwardly to a clamp, to which they are adjustably fastened, substantially as described for the purpose specified.

2. A bicycle-saddle, consisting of two pads or seats, each pad supported by a single wire spring comprising a rim 4, to which the pad is fastened, both ends of said wire spring having a downward bend 5 at the side of the rim or seat and extending inwardly to and beyond a saddle-post clamp 7, to which they are adjustably fastened, in combination with adjustable auxiliary clamps 9, 9, substantially as described, for the purpose specified.

JOHN S. WRIGHT.

Witnesses:
WM. H. VARNUM,
WILLIAM CLAUS.